(12) United States Patent
Brown et al.

(10) Patent No.: US 9,053,330 B2
(45) Date of Patent: *Jun. 9, 2015

(54) METHOD AND DEVICES FOR PROVIDING SECURE DATA BACKUP FROM A MOBILE COMMUNICATION DEVICE TO AN EXTERNAL COMPUTING DEVICE

(71) Applicant: Research In Motion Limited, Waterloo (CA)

(72) Inventors: Michael Kenneth Brown, Fergus (CA); Andrew Douglas Bocking, Conestogo (CA); Scott William Totzke, Waterloo (CA); David Francis Tapuska, Waterloo (CA); Ronald Scotte Zinn, Waterloo (CA); Maxime Matton, Waterloo (CA); Michael Thomas Hardy, Waterloo (CA); George Dos Santos, Toronto (CA); Christopher James Runstedler, Cambridge (CA)

(73) Assignee: BlackBerry Limited, Waterloo (CA)

( * ) Notice: Subject to any disclaimer, the term of this patent is extended or adjusted under 35 U.S.C. 154(b) by 168 days.

This patent is subject to a terminal disclaimer.

(21) Appl. No.: 13/924,070

(22) Filed: Jun. 21, 2013

(65) Prior Publication Data

US 2013/0283049 A1   Oct. 24, 2013

Related U.S. Application Data

(63) Continuation of application No. 11/763,476, filed on Jun. 15, 2007, now Pat. No. 8,484,464.

(51) Int. Cl.
*H04L 29/06* (2006.01)
*G06F 7/00* (2006.01)
(Continued)

(52) U.S. Cl.
CPC .......... *G06F 21/602* (2013.01); *G06F 11/1456* (2013.01); *G06F 11/1464* (2013.01);
(Continued)

(58) Field of Classification Search
CPC ............ G06F 11/1446; G06F 11/1448; G06F 11/1451; G06F 11/1456; G06F 11/1458; G06F 11/1461; G06F 11/1464; G06F 11/1469; G06F 21/602; G06F 21/86; G06F 2201/80; G06F 2221/2143; H04L 2209/80; H04L 9/0894; H04L 9/16; H04W 12/04
See application file for complete search history.

(56) References Cited

U.S. PATENT DOCUMENTS 5,495,533 A   2/1996  Linehan et al.
6,134,660 A   10/2000 Boneh et al.
(Continued)

FOREIGN PATENT DOCUMENTS

CN   10109040 A   12/2007
EP   1158410 A1   11/2001
(Continued)

OTHER PUBLICATIONS

Office Action for corresponding Canadian Patent Application No. 2,634,576; dated Oct. 11, 2011; 6 pages.
(Continued)

*Primary Examiner* — Darren B Schwartz
(74) *Attorney, Agent, or Firm* — Ridout and Maybee LLP

(57) ABSTRACT

A method and devices for providing secure data backup from a mobile communication device to an external computing device is described. In one embodiment, there is provided a method of backing up data from a mobile communication device to an external computing device, the mobile communication device being in communication with the external computing device, the method includes: receiving a request to backup one or more data items stored on the mobile communication device; encrypting a data item using an encryption key stored in a protected memory of the mobile communication device; and transferring the encrypted data item to the external computing device for storage by the external computing device. A method of restoring backup data to a mobile communication device from an external computing device is also provided, as are mobile communication devices and computing devices configured for implementing the backup and restore operations.

25 Claims, 6 Drawing Sheets

(51) Int. Cl.

| | |
|---|---|
| *G06F 21/60* | (2013.01) |
| *G06F 21/86* | (2013.01) |
| *H04L 9/08* | (2006.01) |
| *H04L 9/16* | (2006.01) |
| *H04W 12/04* | (2009.01) |
| *G06F 11/14* | (2006.01) |

(52) U.S. Cl.
CPC ........ *G06F21/86* (2013.01); *G06F 2221/2143* (2013.01); *H04L 9/0894* (2013.01); *H04L 9/16* (2013.01); *H04L 2209/80* (2013.01); *G06F 11/1451* (2013.01); *G06F 11/1458* (2013.01); *G06F 11/1469* (2013.01); *G06F 2201/80* (2013.01); *H04W 12/04* (2013.01)

(56) References Cited

U.S. PATENT DOCUMENTS

| | | |
|---|---|---|
| 6,192,130 B1 | 2/2001 | Otway |
| 6,496,949 B1 | 12/2002 | Kanevsky et al. |
| 6,574,733 B1 | 6/2003 | Langford |
| 6,611,850 B1 | 8/2003 | Shen |
| 6,871,278 B1 | 3/2005 | Sciupac |
| 7,139,846 B1* | 11/2006 | Rossi .................. 710/6 |
| 7,222,233 B1* | 5/2007 | Rubin .................. 713/168 |
| 8,041,641 B1* | 10/2011 | Panchbudhe et al. ......... 705/52 |
| 2001/0056425 A1* | 12/2001 | Richard .................. 707/10 |
| 2002/0016912 A1 | 2/2002 | Johnson |
| 2002/0081995 A1 | 6/2002 | Leppinen et al. |
| 2002/0107877 A1 | 8/2002 | Whiting et al. |
| 2002/0156921 A1 | 10/2002 | Dutta et al. |
| 2002/0161997 A1 | 10/2002 | Yamasaki et al. |
| 2004/0003272 A1 | 1/2004 | Bantz et al. |
| 2004/0049700 A1* | 3/2004 | Yoshida .................. 713/201 |
| 2004/0187012 A1 | 9/2004 | Kohiyama et al. |
| 2004/0236958 A1 | 11/2004 | Teicher et al. |
| 2005/0191998 A1 | 9/2005 | Onyon et al. |
| 2005/0223216 A1 | 10/2005 | Chan et al. |
| 2005/0228994 A1 | 10/2005 | Kasai et al. |
| 2006/0053177 A1 | 3/2006 | Suomela et al. |
| 2006/0143251 A1 | 6/2006 | Peterson et al. |
| 2006/0206544 A1* | 9/2006 | Oks et al. .................. 707/204 |
| 2006/0230081 A1 | 10/2006 | Craswell et al. |
| 2006/0236406 A1 | 10/2006 | Johnson |
| 2007/0038857 A1 | 2/2007 | Gosnell |
| 2007/0100913 A1* | 5/2007 | Sumner et al. .................. 707/204 |
| 2007/0136541 A1 | 6/2007 | Herz et al. |
| 2007/0174362 A1 | 7/2007 | Pham et al. |
| 2007/0220319 A1 | 9/2007 | Desai et al. |
| 2007/0281664 A1 | 12/2007 | Kaneko et al. |
| 2008/0307020 A1* | 12/2008 | Ko et al. .................. 707/204 |
| 2009/0228719 A1 | 9/2009 | Almgren et al. |

FOREIGN PATENT DOCUMENTS

| | | |
|---|---|---|
| WO | WO9964996 A1 | 12/1999 |
| WO | WO03037016 A1 | 5/2003 |
| WO | WO2006054340 A1 | 5/2006 |
| WO | WO2007047302 A2 | 4/2007 |

OTHER PUBLICATIONS

Office Action from related Chinese Patent Application No. 200810178503.2 dated Dec. 31, 2010 and English Translation thereof; 17 pages.

"Backup Premium: Reliability, Confidence, Serenity"; http://www.backup-premium.com; SoftOptima LLC, at least as early as Apr. 23, 2007.

Microsoft TechNet; http://www.microsoft.com; 17 pages; Microsoft Corporation; at least as early as Apr. 23, 2007.

* cited by examiner

METHOD AND DEVICES FOR PROVIDING SECURE DATA BACKUP FROM A MOBILE COMMUNICATION DEVICE TO AN EXTERNAL COMPUTING DEVICE

CROSS-REFERENCE TO RELATED APPLICATIONS

The present application is a continuation of U.S. patent application Ser. No. 11/763,476 filed Jun. 15, 2007, which is owned in common herewith.

TECHNICAL FIELD

The present application relates to security for mobile communication devices, and more particularly to a method and devices for providing secure data backup from a mobile communication device to an external computing device.

BACKGROUND

Mobile communication devices often allow data such as communication data (e.g., email messages, contacts, and calendar entries) to be backed up to a computer connected to the mobile communication device, for example, via a serial data port. Where the mobile communication device is a corporate or other enterprise device which connects to an enterprise network, the mobile communication device may contain confidential information, proprietary information, or information which is otherwise sensitive to the enterprise or corporation. While existing backup solutions allow a user to protect the backup data, for example by encrypting the data, these solutions are user-implemented controls which do not provide the enterprise with control over how data is backed up or restored.

Thus, there exists a need a backup and restore solution that allows enterprises to control the backup and restoration of data and information from enterprise mobile communication devices.

BRIEF DESCRIPTION OF THE DRAWINGS

It will be noted that throughout the drawings similar features are identified by the same reference numerals.

DETAILED DESCRIPTION

Figure 1:
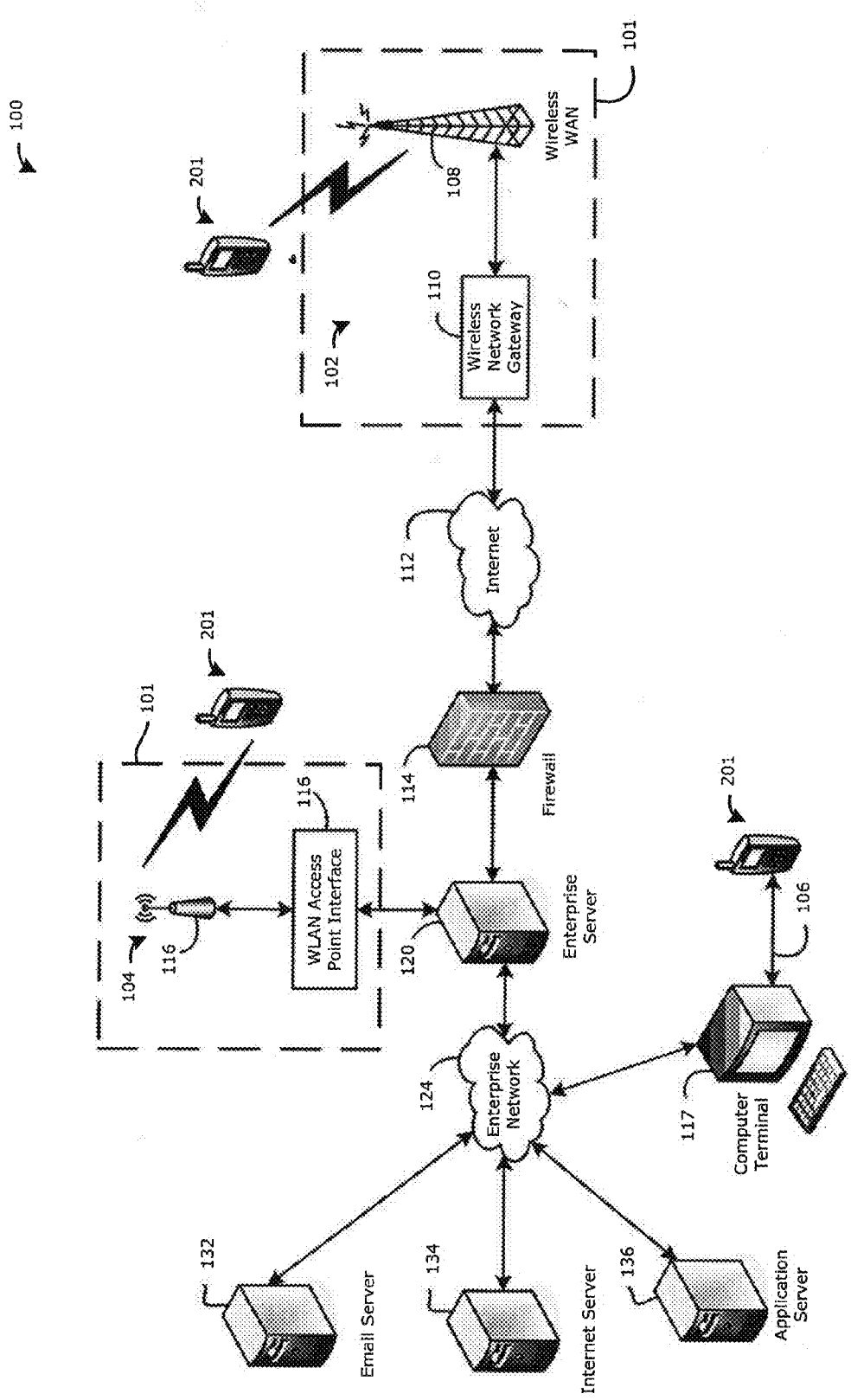
FIG. 1 is a block diagram illustrating a communication system including a mobile communication device to which example embodiments of the present application can be applied.

Reference is first made to FIG. 1 which shows in block diagram form a communication system 100 in which example embodiments of the present application can be applied. The communication system 100 comprises a number of mobile communication devices 201 (FIG. 2) connected to a wireless network 101. The wireless network 101 comprises one or more of a wireless Wide Area Network (WAN) 102 and a Wireless Local Area Network (WLAN) 104. In some embodiments, the mobile communication device 201 is configured to communicate over both the wireless WAN 102 and WLAN 104, and to roam between these networks.

The communication system 100 also comprises a wireless network gateway 110 with connects the mobile communication devices 201 to the Internet 112, and through the Internet 112 to a wireless connector system such as an enterprise server 120. The wireless network gateway 110 provides translation and routing services between the enterprise server 120 and the WAN 102, which facilitates communication between the mobile communication devices 201 and other devices (not shown) connected, directly or indirectly, to the wireless network 101. Accordingly, communications sent via the mobile communication devices 201 are transported via the wireless network 101 to the wireless network gateway 110. The wireless gateway 110 forwards the communications to the enterprise server 120 via the Internet. Communications sent from the enterprise server 120 are received by the wireless network gateway 110 and transported via the wireless network 101 to the mobile communication devices 201.

The wireless WAN 102 may be implemented as a packet-based cellular network that includes a number of transceiver base stations 108 (one of which is shown in FIG. 1) where each of the base stations 108 provides wireless Radio Frequency (RF) coverage to a corresponding area or cell. The wireless WAN 102 is typically operated by a cellular network service provider that provides subscription packages to users of the mobile communication devices 201. In some embodiments, the wireless WAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) or various other third generation networks such as EDGE (Enhanced Data rates for GSM Evolution) or UMTS (Universal Mobile Telecommunication Systems), or various other 3.5G networks such as HSPDA (High-Speed Downlink Packet Access).

The WLAN 104 comprises a wireless network which, in some embodiments, conforms to IEEE 802.11x standards (sometimes referred to as Wi-Fi®) such as, for example, the IEEE 802.11a, 802.11b and/or 802.11g standard. Other communication protocols may be used for the WLAN 104 in other embodiments. The WLAN 104 includes one or more wireless RF Access Points (AP) 114 (one of which is shown in FIG. 1) that collectively provide a WLAN coverage area.

For the embodiment illustrated in FIG. 1, the WLAN 104 is operated by an enterprise (for example, a business or university) and the access points 114 are connected to an access point (AP) interface 116. The AP interface 116 provides translation and routing services between the access points 114 and the enterprise server 120 to facilitate communication between two or more of the mobile communication devices 201 and other devices connected, directly or indirectly, to the enterprise server 120. The AP interface 116 is implemented using a computer, for example, a server running a suitable computer program or software.

The enterprise server 120 may be implemented as one or more server modules, and is typically located behind a firewall 114. The enterprise server 120 provides the mobile communication devices 201 with access to an organization's internal network referred to as an enterprise network 124 and provides administrative control and management capabilities over users and mobile communication devices 201 which may connect to the enterprise network 124. The enterprise server 120 is dedicated to managing communications to and from a set of managed mobile communication devices 201 (the enterprise mobile communication devices 201) such that the mobile communication devices 201 are each enabled to exchange electronic messages and other information with the enterprise network 124.

The enterprise server 120 allows the enterprise mobile communication devices 201 to access resources of the enterprise network 124, such as an email server 132 (for example, a Microsoft Exchange™, IBM Lotus Domino™, or Novell GroupWise™ email server) for connecting to an enterprise email system, an Internet/Web server 134 for connecting to the Internet/World Wide Web, and one or more application servers 136 for implementing enterprise applications or for accessing other servers such as an instant messaging (IM) server for connecting to an Instant messaging system. The enterprise server 120 is configured to direct or redirect email messages, Personal Information Management (PIM), instant messaging (IM) and other corporate data received from the wireless network 101 and internally within the enterprise network 124 to be addressed to the mobile communication devices 201.

The enterprise server 120 also provides secure transmission of email, PIM, IM and other corporate or enterprise data transmitted from the enterprise server 120 to enterprise mobile communication devices 201. In some embodiments, communications between the enterprise server 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. The private encryption key is stored only in the user's mailbox on the email server 132 and on the mobile communication device 201, and can typically be regenerated by the user on mobile communication devices 201. Data sent to the mobile communication devices 201 is encrypted by the enterprise server 120 using the private encryption key retrieved from the user's mailbox. The encrypted data, when received on the mobile communication devices 201, is decrypted using the private encryption key stored in memory. Similarly, data sent to the enterprise server 120 from the mobile communication devices 201 is encrypted using the private encryption key stored in the memory of the mobile communication device 201. The encrypted data, when received on the enterprise server 120, is decrypted using the private encryption key retrieved from the user's mailbox.

In some embodiments, the enterprise server 120 comprises a mobile data delivery module (not shown) which provides connectivity between the wireless WAN 102 and the WLAN 104 and the other connections 106 and mobile communication devices 201 and/or networks connected directly or indirectly to the enterprise server 120. Alternatively, the mobile data delivery module (not shown) may be implemented by a separate server or server application which is connected to the enterprise server 120. In some embodiments, the mobile data delivery module (not shown) provides TCP/IP (transmission control protocol/Internet protocol) and HTTP (hypertext transfer protocol)-based connectivity providing an Internet based service connection. The mobile data delivery module provides access for the mobile communication devices 102 to the Internet 112 and World Wide Web (WWW) and possibly other external communication networks.

The wireless network gateway 110 is adapted to route data packets received from the mobile communication device 201 over the wireless network 101 to destination email and/or Instant messaging server 132, Internet/Web servers 134, and one or more application servers 134 through the mobile data delivery module, and to route data packets received from the servers 132, 134, 136 through the mobile data delivery module over the wireless network 101 to a destination mobile communication device 201. The wireless network gateway 110 forms a connection or bridge between the servers 132, 134, 136 and wireless networks associated with wireless e-mail communication and/or Internet access.

The enterprise network 124 may comprise a private local area network, wide area network, or combinations thereof. Typically, the enterprise network 124 is an intranet of a corporation or other organization. The enterprise server 120 may also provide access to other public or private communication networks such as the Internet 112. A plurality of enterprise computer terminals 117 (one of which is shown in FIG. 1) such as desktop or notebook computers are connected to the enterprise network 124. An enterprise user associated with a particular mobile communication device 201 typically has an enterprise computer terminal 117 designated for his or her use that is connected to the enterprise network 124 by a wired connection or through a WLAN access point interface 116.

Using a physical interface or short-range wireless communication interface 106, the user can connected to his or her enterprise computer terminal 117 via the mobile communication device 201. The physical interface comprises one or more of an Ethernet port, Universal Serial Bus (USB) port, Firewire™ (also known as an IEEE 1394 interface) port, or other serial data port on the mobile communication device 201, which when connected via a computer terminal 117 such as a desktop or laptop computer, allows the exchange of information between the enterprise server 120 and the mobile communication devices 201. The short-range wireless communication interface comprises one or more of an infrared (IR) or short-range radio frequency (RF) communication such as Bluetooth® or other wireless personal area network (PAN) interface which allows the mobile communication device 201 to exchange information with the computer terminal 117, and the enterprise server 120 via the computer terminal 117.

It will be appreciated that the above-described communication system is provided for the purpose of illustration only, and that the above-described communication system comprises one possible communication network configuration of a multitude of possible configurations for use with the mobile communication devices 201. Suitable variations of the communication system will be understood to a person of skill in the art and are intended to fall within the scope of the present application.

Figure 2:
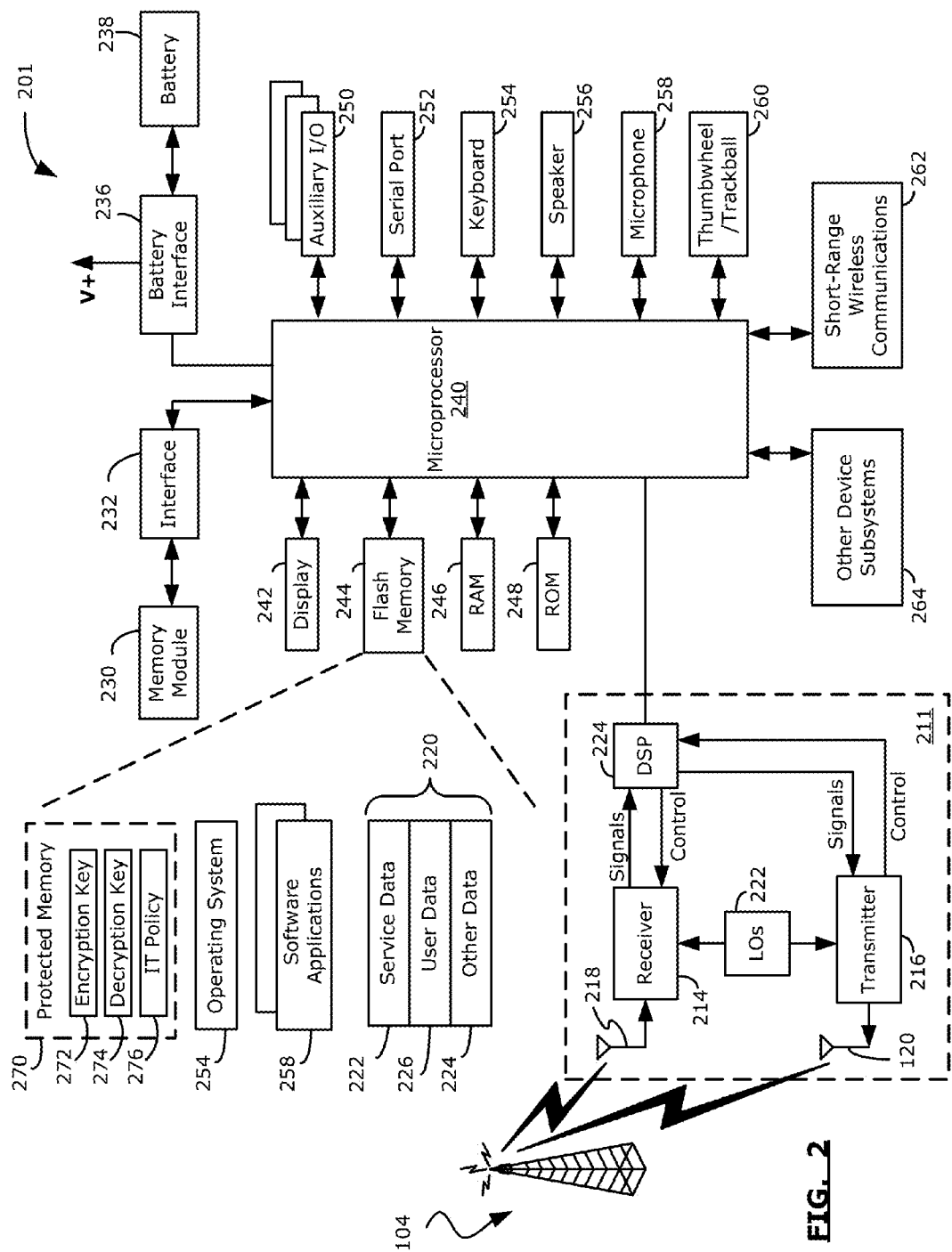
FIG. 2 is a block diagram illustrating a mobile communication device which is in example embodiments of the present application can be applied.

Reference is next made to FIG. 2 which illustrates in block diagram form a mobile communication device 201 in which example embodiments described in the present application can be applied. The mobile communication device 201 is a two-way communication device having at least data and possibly also voice communication capabilities, and the capability to communicate with other computer systems, for example, via the Internet. Depending on the functionality provided by the mobile communication device 201, in various embodiments the device may be a data communication device, a multiple-mode communication device configured for both data and voice communication, a mobile telephone, a PDA (personal digital assistant) enabled for wireless communication, or a computer system with a wireless modem.

The mobile communication device 201 includes a wireless communication subsystem 211 for exchanging radio frequency signals with the wireless network 101. The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile communication device 201. As will be apparent to those skilled in the field of communication, the particular design of the communication subsystem 221 depends on the wireless network 101 in which mobile communication device 201 is intended to operate.

The mobile communication device 201 may communicate with any one of a plurality of fixed transceiver base stations 108 of the wireless network 101 within its geographic coverage area. The mobile communication device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220. The DSP 224 not only processes communication signals, but also provides for receiver and transmitter control. For example, the gains applied to communication signals in the receiver 214 and the transmitter 216 may be adaptively controlled through automatic gain control algorithms implemented in the DSP 224.

The mobile communication device 201 includes a microprocessor 240 which controls the overall operation of the mobile communication device 201. The microprocessor 240 interacts with communication subsystem 211 which performs communication functions. The microprocessor 240 also interacts with additional device subsystems such as a display 242, flash memory 244, random access memory (RAM) 246, read only memory (ROM) 248, auxiliary input/output (I/O) subsystems 250, a data port 252 such as serial data port (for example, a Universal Serial Bus (USB) data port), a keyboard or keypad 254, a speaker 256, microphone 258, a clickable thumbwheel (trackwheel) or trackball 260, a short-range communication subsystem 262, and other device subsystems generally designated as 264.

Some of the subsystems shown in FIG. 2 perform communication-related functions, whereas other subsystems may provide "resident" or on-device functions. Notably, some subsystems, such as the keypad 254, the display 242, and the clickable thumbwheel/trackball 260, for example, may be used for both communication-related functions, such as entering a text message for transmission over the wireless network 101, and executing device-resident functions such as a calculator or task list.

Operating system 254 software used by the microprocessor 240 is preferably stored in a persistent store such as the flash memory 244, which may alternatively be the ROM 248 or similar storage element. Those skilled in the art will appreciate that the operating system 254, specific device applications 258, or parts thereof, may be temporarily loaded into a volatile store such as the RAM 246.

In some embodiments, the mobile communication device 201 also includes a removable memory card 230 (typical comprising flash memory) and a memory card interface 232. Network access to the WAN 102, and possibly the WLAN 104, is typically associated with a subscriber or user of the mobile communication device 201 via the memory card 230, which may be a Subscriber Identity Module (SIM) card for use in a GSM network or other type of memory card for use in the relevant wireless network type. The memory card 130 is inserted in or connected to the memory card interface 232 of the mobile communication device 201 in order to operate in conjunction with the wireless network 101.

The mobile communication device 201 stores data 220 in an erasable persistent memory, which in one example embodiment is the flash memory 244. In various embodiments, the data 220 includes service data 222 comprising information required by the mobile communication device 201 to establish and maintain communication with the wireless communication network 200 (wireless network service data) and the wireless gateway 210 (gateway service data). The data 220 may also include other data 224, user application data 226 such as email messages, address book and contact information, calendar and schedule information, notepad documents, image files, and other commonly stored user information stored on the mobile communication device 201 by its user. The data 220 may also include data required for the communication layers managed by the enterprise server 120 and servers 132, 134, 136. The data 220 may includes critical data that the user of mobile communication device 201 or the user's associated enterprise does not want to be accessed by an unauthorized party. Some of the data 220 may be stored on the memory card 230. The data 220 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory.

The serial data port 252 may be used in a PDA-type communication device for synchronization with a user's computer terminal 117. The serial data port 252 is a Universal Serial Bus (USB) port in some embodiments. The serial data port 252 enables a user to set preferences through an external device or software application and extends the capabilities of the mobile communication device 201 by providing for information or software downloads to the mobile communication device 201 other than through the wireless network 101. The alternate download path may, for example, be used to load an encryption key onto the mobile communication device 201 through a direct, reliable and trusted connection to thereby provide secure device communication.

The mobile communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 262 is an additional optional component which provides for communication between the mobile communication device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices (Bluetooth® is a registered trademark of Bluetooth SIG, Inc.).

The microprocessor 240, in addition to its operating system functions, enables execution of software applications on the mobile communication device 201. A predetermined set of applications that control basic device operations, including data and possibly voice communication applications will normally be installed on the mobile communication device 201 during or after manufacture. Additional applications may also be loaded onto the mobile communication device 201 through the wireless network 101, the auxiliary I/O subsystem 250, the serial port 252, the short-range communication subsystem 262, or other suitable subsystem 264, and installed by a user in the RAM 246 or a non-volatile store such as the ROM 248 for execution by the microprocessor 240. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may include a personal information manager (PIM) application having the ability to organize and manage data items relating to a user such as, but not limited to, instant messaging, email, calendar events, voice mails, appointments, and task items. One or more memory stores are available on the mobile communication device 201 and the memory card 230 to facilitate storage of PIM data items and other information. The PIM application has the ability to send and receive data items via the wireless network 101. In some example embodiments, PIM data items are seamlessly combined, synchronized, and updated via the wireless network 101, with the user's corresponding data items stored and/or associated with the user's computer terminal 117, thereby creating a mirrored host computer on the mobile communication device 201 with respect to these data items. This is advantageous where the host computer system is the user's office computer system.

In a data communication mode, a received data signal representing information such as a text message, an email message, or Web page download will be processed by the communication subsystem 211 and input to the microprocessor 240. The microprocessor 240 will further process the signal for output to the display 242 or alternatively to the auxiliary I/O device 250. A user of the mobile communication device 201 may also compose data items, such as email messages, for example, using the keypad 254 and/or the clickable thumbwheel or trackball 260 in conjunction with the display 242 and possibly the auxiliary I/O device 250. The keypad 254 maybe either a complete alphanumeric keypad or telephone-type keypad. These composed items may be transmitted through the communication subsystem 211 over the wireless network 101.

In a voice communication mode, the overall operation of the mobile communication device 201 is similar, except that the received signals would be output to the speaker 256 and signals for transmission would be generated by a transducer such as the microphone 258. Alternative voice or audio I/O subsystems, such as a voice message recording subsystem, may also be implemented on the mobile communication device 201. Although voice or audio signal output is typically accomplished primarily through the speaker 256, the display 242 may also be used to provide an indication of the identity of a calling party, duration of a voice call, or other voice call related information.

Figure 3:
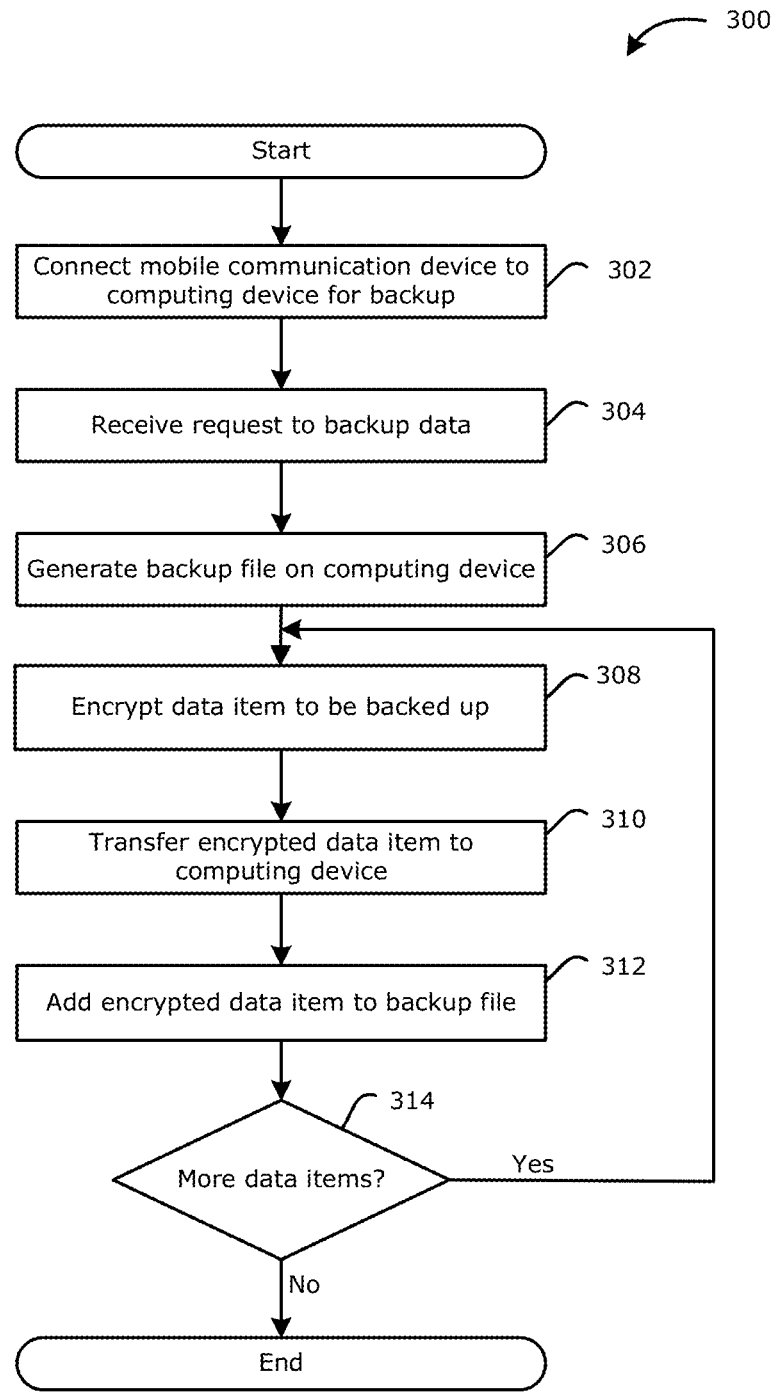
FIG. 3 is a flowchart illustrating a backup process according to an example embodiment of the present application.
Figure 4:
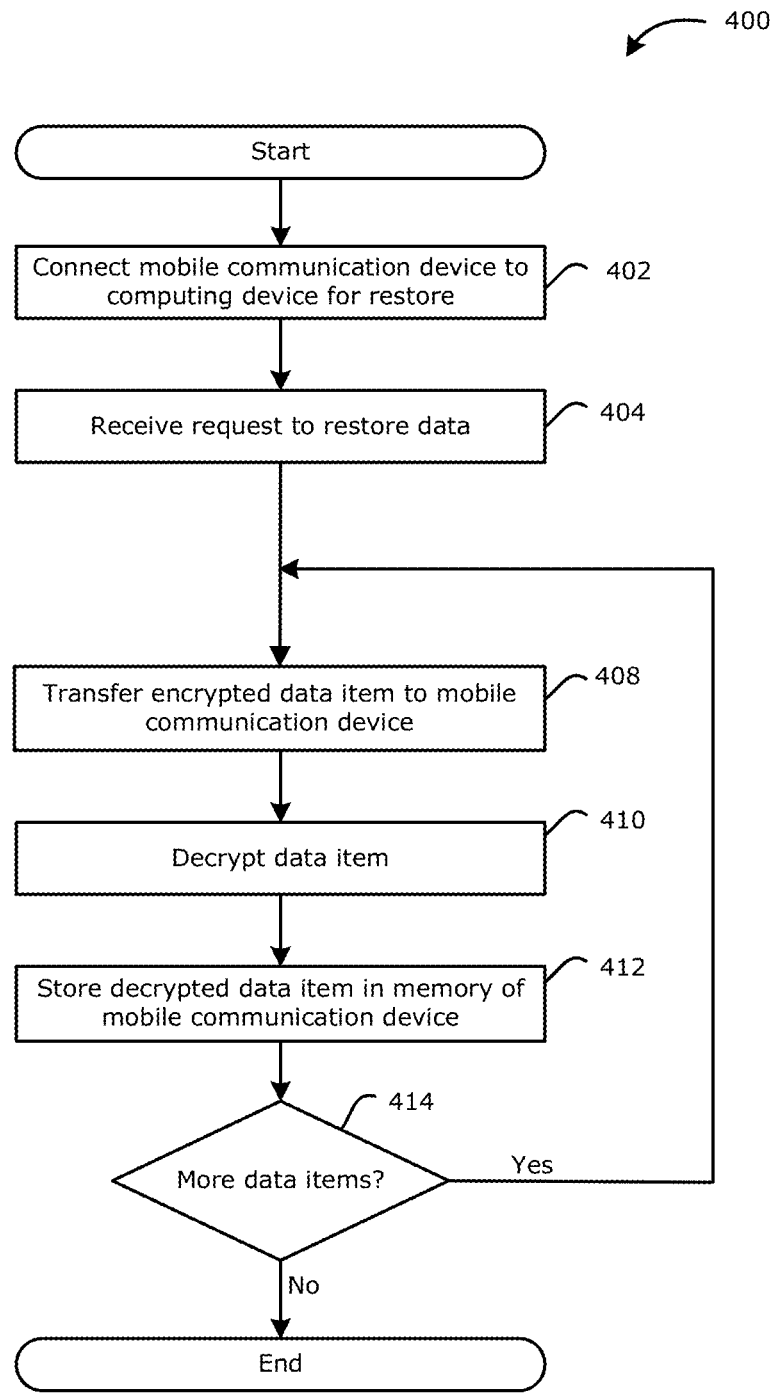
FIG. 4 is flowchart illustrating a restore process according to an example embodiment of the present application.
Figure 5:
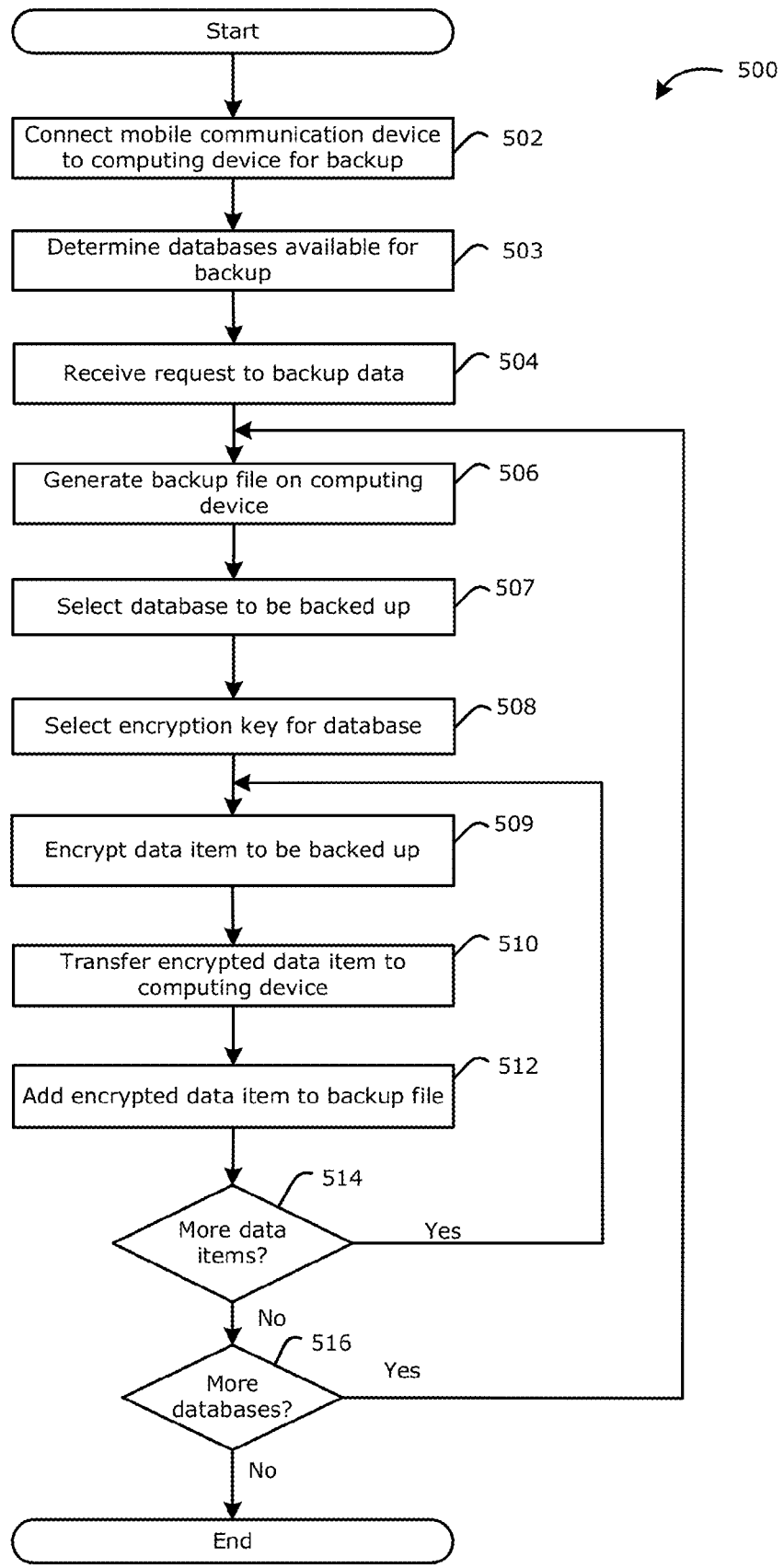
FIG. 5 is a flowchart illustrating a backup process according to another example embodiment of the present application.
Figure 6:
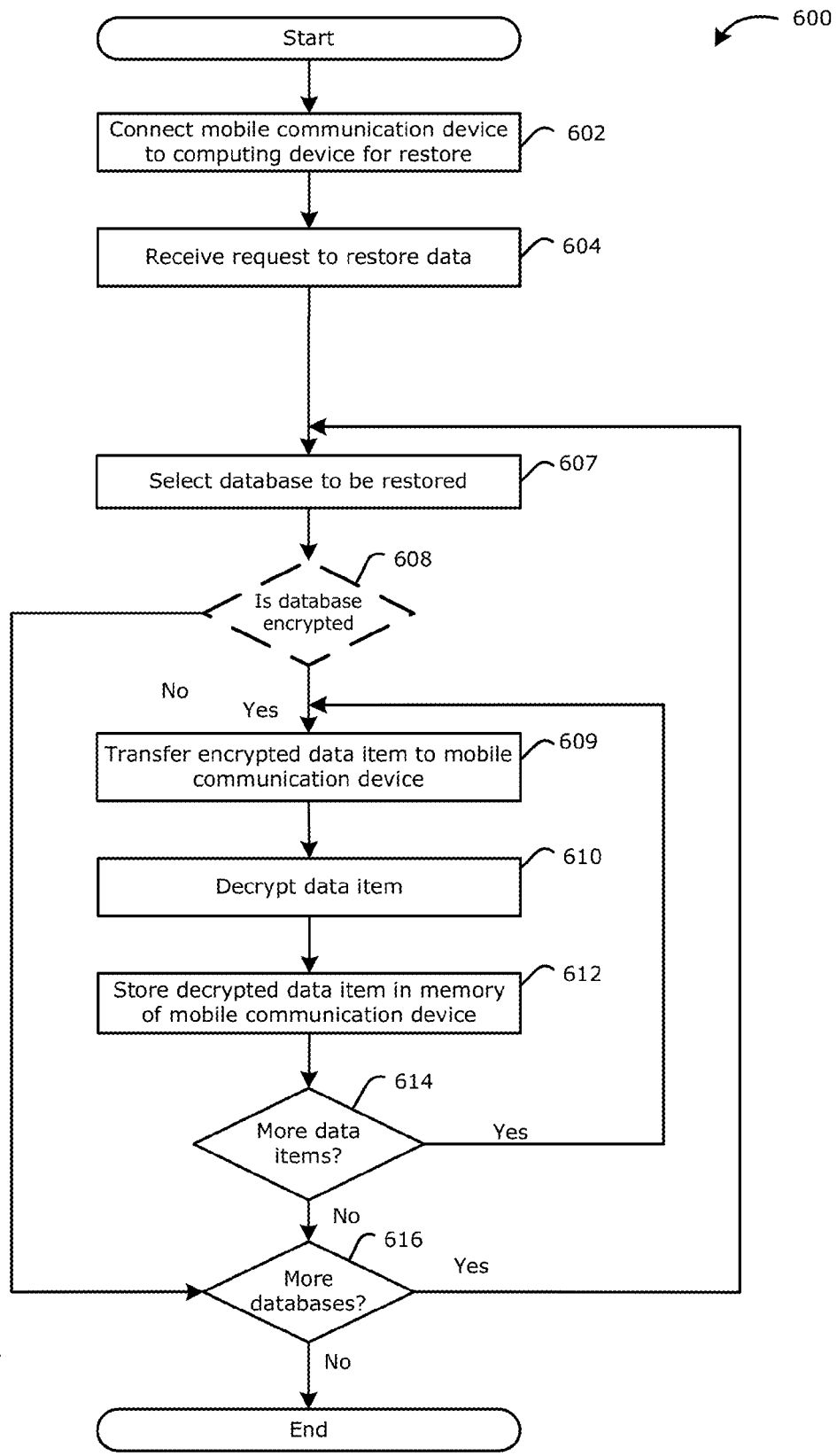
FIG. 6 is flowchart illustrating a restore process according to another example embodiment of the present application.

FIG. 3 illustrates a flowchart of a backup process 300 in accordance with a first example embodiment of the present application. FIG. 4 illustrates a flowchart of a restore process 400 in accordance with a first example embodiment of the present application. FIG. 5 illustrates a flowchart of a backup process 500 in accordance with another example embodiment of the present application. FIG. 6 illustrates a flowchart of a restore process 600 in accordance with another example embodiment of the present application. Prior to discussing the backup and restore processes, additional features and capabilities of the enterprise server 120 relevant to backup and restore processes will be described.

The enterprise server 120 is configured to enforce IT (information technology) policies on the mobile communication devices 201. IT policies are rules which govern the functionality of the mobile communication devices 201. The enterprise server 120 may periodically transmit IT policy messages to enforce, modify, or terminate IT policies on the connected computing devices. The enterprise server 120 transmits the IT policy messages through the wireless network 101 to its managed mobile communication devices 201 or via the physical interface (e.g., serial data port 252 such as a USB port) or short-range wireless communication interface (e.g., Bluetooth® connection) 106 when connected to the user's enterprise computer terminal 117. The IT policy messages may be security policies (such as data protection security policies), information and/or security settings regarding these policies, and/or commands to be executed by the mobile communication devices 201. The IT policies can be set by an IT administrator of the enterprise network 124 by sending an appropriate IT policy message to the mobile communication devices 201 managed by the enterprise server 120. The periodic transmission of IT policy messages from the enterprise server 120 to the managed mobile communication devices 201 assists in ensuring, among other things, that each of the mobile communication devices 201 is kept up to date with the latest IT policy. The content and frequency of IT policy messages may be set by the IT administrator. In at least some embodiments, the enterprise server 120 generates a private and public key pair for each mobile communication device 201 to authenticate the IT policy messages. The IT policy private key is stored in the enterprise server 120. The IT policy public key is stored on the mobile communication device 201. The enterprise server 120 digitally signs all IT policy messages using the IT policy public key which uses the IT policy public key to authenticate the digital signature in received IT policy messages.

In one embodiment, elements of the backup and restore processes described below are implemented via an IT policy message which is pushed out to the mobile communication devices 201. Using IT policy messages the mobile communication devices 201 can be instructed to enforce, modify, or terminate aspects of the backup and restore processes. In particular, IT policy messages can be used to instruct the mobile communication device 201 to encrypt data using an encryption key (which may be included in the IT policy message) prior to sending data to a backup application on an external computing device. Similarly, IT policy messages can be used to instruct the mobile communication device 201 to decrypt backup data received from a restore application on an external computing device using a decryption key. Using IT policy messages in this manner allows secure backup and restore functionality to be added to mobile communication devices 201 already managed by the enterprise server 120, and in new mobile communication devices 201 which are added to the list of devices managed by the enterprise server 120 (including new users, device replacements or upgrades, or device switches). In some embodiments, the IT administrator has the option of setting the IT policy globally for all mobile communication devices 201 managed by the enterprise server 120, or for groups or classes of mobile communication devices 201 managed by the enterprise server 120, or for one or more individual communication devices managed by the enterprise server 120.

Referring now to FIG. 3, a secure backup process 300 in accordance with an example embodiment of the present application will be described. The backup process 300 provides a method of securely backing up data stored on a mobile communication device 201 to an external computing device, such as the user's enterprise computer terminal 117 or home computer. The backup process 300 encrypts data being backed up to the computing device using an encryption key 272 stored on the mobile communication device 201. The encryption key 272 is stored locally on the mobile communication device 201 in persistent memory, for example, in flash memory 244.

In some embodiments, the encryption key 272 is stored in protected memory 270 of the mobile communication device 201, for example, in flash memory 244. The protected memory 270 is protected from user access, device wipes (for example, device wipes initiated by the user, or resulting from device replacements or switches, or from triggered data security protections) which erase data stored on the mobile communication device 201, or both. Access to the protected memory 270, and in particular the encryption key and decryption keys, is also restricted to authorized applications, and typically authorized applications are restricted to authorized uses. Storage of the encryption key 272 in protected memory 270 prevents the user of the mobile communication device 201 from accessing the encryption key 272 and tampering with the encryption key 272 in an attempt to modify or delete the key, or otherwise prevent or alter the encryption of data during the backup process 300. Methods of implementing memory protection are known in the art and will not be described.

Generally, the encryption key 272 (and decryption key) may only be added, updated, or removed via an IT policy message sent via the enterprise server 120. In this way, encryption and decryption key control authority is restricted to the enterprise server 120 and the IT administrator. Typically, the encryption key 272 is only accessible by the mobile communication device 201 when the access request is received from an authorized program application such as the backup application. Even in such cases, access is typically limited to authorized purposes such as encrypting data items to be sent to an external computing device in response to a request for the items during a backup operation. Likewise, the decryption key is typically only accessible by the mobile communication device 201 when the access request is received from an authorized program application such as the restore application, and typically only for authorized purposes such as decrypting encrypted data items received from an external computing device during a restore operation. Alternatively, other forms of protecting the encryption and decryption keys may be used. The IT policy messages 276 and/or rules contained within the IT policy messages may be stored in the memory (e.g., flash memory 244) of the mobile communication device 201. In addition, in some embodiments IT policy messages 276 and/or rules contained within the policy messages may be stored in the protected memory 270 of the mobile communication device 201.

In some embodiments, the encryption key 272 is a symmetric key used both as an encryption key for encrypting data during a backup operation, and as a decryption key for decrypting backup data during a restore operation. The encryption key 272 is an AES (Advanced Encryption Standard) key in some embodiments, and a Triple Data Encryption Standard (Triple DES) key in other embodiments. Other types of suitable symmetric keys will be appreciated by persons skilled in the art. Methods for establishing symmetric encryption keys 272 on the enterprise server 120 and mobile communication device 201 are known in the art and will not be described in detail. Generally, the encryption key 272 may be generated by the enterprise server 120 which maintains a copy of the encryption key 272, and transmits a copy of the encryption key 272 to the mobile communication device 201. In some embodiments, the encryption key 272 may be transmitted in an IT policy message sent by the enterprise server 120 to the mobile communication device 201.

In other embodiments, the encryption key 272 is an asymmetric key which is part of a public-private key pair. In asymmetric key implementations, the encryption key 272 is a public key stored locally on the mobile communication device 201 and on the enterprise server 120. Unlike the symmetric encryption key 272 described above, a separate, private decryption key 274 is required to decrypt backup data on restore operations. Both the public encryption key 272 and private decryption key 274 are stored locally on the mobile communication device 201 in persistent memory, for example, in the flash memory 244, and on the enterprise server 120. In some embodiments, the public encryption key 272 and private decryption key 274 are stored in protected memory 270 of the mobile communication device 201, as described above. Methods for establishing asymmetric private-public key pairs between the enterprise server 120 and mobile communication device 201 for encryption and decryption are known in the art and will not be described in detail. Generally, the public encryption key 272 and private decryption key 274 may be generated by the enterprise server 120 which maintains a copy of the encryption key 272 and private decryption key 274, and transmits the encryption key 272 and decryption key 274 to the mobile communication device 201. In some embodiments, the public encryption key 272 and private decryption key 274 may be transmitted in an IT policy message sent by the enterprise server 120 to the mobile communication device 201.

In the first step 302, the mobile communication device 201 is connected to the computing device. The mobile communication device 201 may be connected to the computing device via a data port of the computing device and the serial data port 252 of the mobile communication device 201, or via a short-range wireless communication interface (for example, such as Bluetooth®) between the computing device and the mobile communication device 201. The computing device is provided with a backup program or utility, typically as part of a combined backup and restore program. The backup and restore program is configured for backing up data from the mobile communication device 201 in the form of a backup file, and for restoring data contained in local backup files to the mobile communication device 201. In some embodiments, the backup and restore program or utility application is provided as part of a desktop management software suite for managing data and connections between the external computing device and the mobile communication device 201.

In some embodiments, the backup file is an IPD file or a backup file compatible with the IPD file format. The IPD file format is known in the art and is described in the Blackberry Developer Journal, Volume 3, Issue No. 1, January 2006, published by Research in Motion Limited (http://na.blackberry.com/eng/developers/resources/journals/jan 2006/ BlackBerryDeveloperJournal-0301.pdf), which is incorporated herein by reference. In some embodiments, the backup file is organized into a number of databases each containing data items of the same data type. For example, email messages, contact records, and task items may be stored in individual databases within the backup file.

In some embodiments, after launching the backup and restore program, the user of the mobile communication device 201 may be given an option of selecting the data items (or databases) to be backed up, for example using a selection window or menu presented in a graphical user interface (GUI) provided by the backup and restore program.

Next, in step 304 a request to backup one or more data entries or data items stored on the mobile communication device 201 is received. The request is typically made by user input received via the GUI of the backup and restore program running on the external computing device. Alternatively, the request may be received from the mobile communication device 201.

In some embodiments, the data on the mobile communication device 201 may be organized into a number of databases each containing data items of the same data type. In some embodiments, the GUI of the backup and restore program may present the data stored in mobile communication device 201 in this manner for easier selection by the user. In these embodiments, the request from the user may be a request to backup one or more databases selected by the user, a request to backup all databases on the mobile communication device, a request to backup up one or more data items in a database selected by the user, or a request to backup all data items on the mobile communication device 201.

The data items available for backup may comprise user application data 226, service data 222, and other data 224. In some embodiments, the user application data 226 may comprise: email messages, instant messages, address book and contact information, contact records, Short Messaging Service (SMS) messages, text messages, PIN messages, calendar and schedule information such as calendar events and appointments/meetings, voicemail messages, notepad documents, and combinations thereof.

It will be appreciated that the particular databases resident on the mobile communication device 201 depends on the particular applications and features provided by the particular mobile communication device 201, and that the content of the various databases depends on the data stored in association with the particular applications and features. In one example embodiment, the device memory, for example the flash memory 244, comprises databases of data items for the following: Address Book; Address Book Options; Alarm Options; Application Permissions; Attachment Data; Attachment Options; Auto Text; Device Messenger; Bluetooth® Options; Browser Bookmarks; Browser Channels; Browser Data Cache; Browser Folders; Browser Messages; Browser Options; Browser Push Options; Browser Uniform Resource Locators (URLs); Calendar; Calendar Options; Categories; Certificate Options; Content Store; Custom Words Collection; Default Service Selector; Device Options; Email Filters; Email Settings; Enterprise Configuration; File Explorer Options; Firewall Options; Folder identifiers (IDs); Folders; Handheld Agent; Handheld Configuration Handheld key store; Input Learning Data; Input Method Switcher Option; Key Store Options; Key Store Manager; Map Locations; MemoPad Options; Memory Cleaner Options; Memos; Message List Options; Messages; Multimedia Messaging Service (MMS) Messages; MMS Options; Options; Passwords; Password Options; PGP Key Store; Phone Call Logs; Phone Hotlist; Phone Options; Personal identification number (PIN) Messages; Policy; Profiles; Profile Options; Purged Messages; Quick Contacts; Random Pool; Recipient Cache; Ribbon Bar Positions; Rights Management Services (RMS) Databases; Saved Email Messages; Searches; Secure Email Decision Maker; Service Book; Setup Wizard Options; Smart Card Options; Short Message Service (SMS) Messages; Suretype® Options; Tasks; Tasks Options; Time Zones; Transport Layer Security (TLS) Options; Trusted Key Store; Voice Activated Dialing Options; Wireless Application Protocol (WAP) Push Messages; and Wireless Transport Layer Security (WTLS) Options.

In some embodiments, a step of determining which data items and/or databases are available for backup is performed, typically by the mobile communication device 201. It will also be appreciated that particular data items and/or databases on the mobile communication device 201 may be not be subject to the backup process. In other words, not all the data on the mobile communication device 201 may be backed up due to controls placed on the data, for example, by IT policies. In this way, the IT administrator may create one or more IT policies which limit the data items and/or databases that may be backed up, and then pushes the IT policies out to enterprise mobile communication devices 201. In some embodiments, the IT administrator has the option of setting the IT policy globally for all mobile communication devices 201 managed by the enterprise server 120, restricting the IT policy to groups or classes of mobile communication devices 201 managed by the enterprise server 120, or restricting the IT policy to one or more individual communication devices managed by the enterprise server 120.

Where backup controls limiting the data items and/or databases which may be backed up are implemented, and the user is given the option of selecting the data items (or databases) to be backed up, the protected data items/databases will not be available for selection. In these embodiments, the step of determining which data items and/or databases are available for backup is performed prior to presenting the selection menu to the user, and prior to the step 304 of receiving the backup request. In other embodiments, the determining step may occur after receiving the backup request in step 304, for example, in embodiments where the user does not have the option of selecting the data for backup.

Next, in step 306 the backup file is generated on the computing device. At this stage, the backup file is empty but contains the basic structure and conforms to the backup file format such as, for example, the IPD file format.

Next, in step 308 the mobile communication device 201 encrypts a data item selected for backup using the encryption key 272 stored in memory 244. Optionally, the mobile communication device 201 may determine if the selected data item or database is subject to encryption, for example, by consulting the relevant IT policies stored in the memory of the mobile communication device 201, for example, in flash memory 244. If the IT policies do not specify that the data item or database is to be encrypted or specify that the data item or database is not to be encrypted, the operations 300 proceed to step 314 where a check is performed to determine if there are more data items to be backed up.

Next, in step 310 the encrypted data item is transferred to the computer device from the mobile communication device 201.

Next, in step 312 the encrypted data item is received on the computing device from the mobile communication device 201 and added to the backup file.

Next, if there are more data items to be backed up (step 314), the backup operations 300 loop back to step 308 where the next data item is encrypted. Operations 300 proceed until all selected items are backed up. If there are no more data items to be backed up (step 314), the backup file is stored in persistent memory of the external computing device and the operations 300 end.

Typically, individual data items are encrypted, transferred to the computing device, and added to the backup file in series until all data items have been backed up. However, in some embodiments the data items of each database may be encrypted on the mobile communication device 201, then transferred to the computing device en masse, and added to the backup file. In yet other embodiments, all data items may be encrypted on the mobile communication device 201, then transferred to the computing device en masse, and added to the backup file. Though not described above, the backup program may organize the encrypted data items within the backup file, for example, into the databases described above.

In the above-described embodiment, the encryption key 272 is associated with a particular enterprise user or enterprise mobile communication device 201. Depending on the particular use case scenario, an enterprise user may have more than one enterprise mobile communication device 201 in which case each device would have the same encryption and decryption keys associated with the same user name/ID in the enterprise network 124, and each device would have the encryption and decryption keys stored in memory on activation of each enterprise mobile communication device 201 on the enterprise server 120, or upon enforcement of the IT policy to implement the secure backup and restore operations described in the present application (if the enterprise device has already been activated). In alternative embodiments, separate keys may be used for each enterprise user or enterprise mobile communication device 201 for each database. The implementation of a per user/database key may increase security in that an attacker would have to break each decryption key in order to access the underlying data stored in each database of the backup file.

It will be appreciated that any application running on the external computing device where the backup file is stored, i.e. the user's enterprise computer terminal 117 or home computer, cannot access the data within the backup file because it is encrypted and the external computing device does not have access to the encryption or decryption keys required to decrypt the data within the backup file. If the user of the enterprise mobile communication device 201 were to attempt to restore the data contained in the backup file from the external computing device to another mobile communication device 201 which was not been activated on the enterprise server 120 (i.e., is not an enterprise device), the restore operation will fail since the non-enterprise mobile communication device does not have the required decryption keys.

Referring now to FIG. 4, a restore process 400 in accordance with an example embodiment of the present application will now be described. The process 400 provides a method of restoring data from a backup file containing encrypted data created by the backup process 300 to a mobile communication device 201. As described above in connection with the backup process 300, the restore process 400 requires a decryption key 274 to be stored in the memory of the mobile communication device 201. The decryption key 274 may be the same as the encryption key 272 if a symmetric key protocol is implemented. However, if an asymmetric key protocol is implemented, the decryption key 274 is a private key corresponding to a public encryption key 272 used to encrypt the data.

In the first step 402, the mobile communication device 201 is connected to the computing device (i.e., the user's enterprise computer terminal or home computer terminal) where the backup file, for example an IPD file or backup file compatible with the IPD file format, is stored.

Next, in step 404, the computing device receives a request to restore the backup file comprising one or more encrypted data items to the mobile communication device 201. The restore request is typically made by the user using the backup and restore program on the external computing device, however the request may be received from the mobile communication device 201. Optionally, the mobile communication device 201 may be configured to perform a check to determine if the backup file contains encrypted data, and if the backup file does not contact encrypted data, the mobile communication device 201 will not accept the databases. This optional step may be performed on database-by-database basis, rather than as a preliminary check of the backup file. The optional check may be implemented via the IT policy which is specified by the enterprise server 120.

Next, in step 408, an encrypted data item is extracted from the backup file on the computing device and transferred to the mobile communication device 201.

Next, in step 410, the encrypted data item is decrypted using the decryption key 274. If there is no decryption key 274 stored in the memory of the mobile communication device 201, or if the decryption key 274 does not match, the decryption operation fails and, typically, the restore operation 400 ends.

Next, in step 412, the decrypted data item is stored in memory, for example flash memory 244, of the mobile communication device 201. The mobile communication device 201 may also organize the stored data items, for example, into the databases described above. This organization step may occur at this time, or after all data items have been restored.

Next, if there are more data items to be restored (step 414), the restore operations 400 loop back to step 408 where the next data item is transferred to the mobile communication device 201. Operations 400 proceed until all items in the backup file have been restored to the mobile communication device 201. If there are no more data items to be restored (step 414), the operations 400 end.

Referring now to FIG. 5, a secure backup process 500 in accordance with another example embodiment of the present application will be described. The backup process 500 is similar to the process 300 described above except that it encrypts and transfers data items to the computing device on database-by-database basis, and optionally provides for multiple encryption and decryption pair keys (which may be symmetric or asymmetric), for example, providing a separate encryption and decryption key pair for each database for a particular enterprise user or mobile communication device 201. In the first step 502, the mobile communication device 201 is connected to the computing device.

Next, in optional step 503, the data items and/or databases which are available for backup is determined. Typically, this step is performed by the mobile communication device 201 by consulting the relevant IT policies stored in the memory of the mobile communication device 201, for example, in flash memory 244.

In some embodiments, after launching the backup and restore program, the user of the mobile communication device 201 may be given an option of selecting the data items (or databases) to be backed up, for example using a selection window or menu presented in the GUI provided by the backup and restore program.

Next, in step 504 a request is received to backup one or more databases stored on the mobile communication device 201 is received, where each database comprises one or more data items of a particular data type. The request is typically made by user input received via the GUI of the backup and restore program running on the external computing device. Alternatively, the request may be received from the mobile communication device 201.

Next, in step 506 the backup file is generated on the computing device.

Next, in step 507 a database for backup is selected. Next, in optional step 508, the mobile communication device 201 selects the encryption key 272 associated with the selected database. In some embodiments, only some of the databases may be encrypted and therefore only some of the databases may have an associated encryption key 272. Optionally, the mobile communication device 201 may determine if the selected database is subject to encryption, for example, by consulting the relevant IT policies stored in the memory of the mobile communication device 201, for example, in flash memory 244. If the IT policies do not specify that the database is to be encrypted or specify that the data database is not to be encrypted, the operations 500 proceed to step 516 where a check is performed to determine if there are more databases to be backed up.

Next, in step 509 the mobile communication device 201 encrypts the first data item in the database for backup using the selected encryption key 272 for the selected database.

Next, in step 510 the encrypted data item is transferred to the external computing device from the mobile communication device 201.

Next, in step 512 the encrypted data item is received on the computing device from the mobile communication device 201 and added to the backup file.

Next, if there are more data items to be backed up (step 514), the backup operations 500 loop back to step 508 where the next data item is encrypted. The operations 500 proceed until all the data items in all selected database are backed up. If there are no more data items to be backed up (step 514), the operations proceed to step 516 where a check is performed to see if there are more databases to be backed up. If there are more databases to be backed up, the backup operations 500 loop back to step 507 where the next database is selected. If there are no more databases to be backed up (step 514), the backup file is stored in persistent memory of the external computing device and the operations 500 end.

The backup operations described in the present application provide the IT administrator with some flexibility regarding the controls to be placed on device data during a back up operation. The IT administrator may optionally control, via IT policy messages sent from the enterprise server 120, which databases can be backed up, and optionally which databases which are made available to the user for backup are encrypted, and optionally what encryption key (and decryption key) is to be applied to each database. For example, the IT administrator may be concerned about controlling the backup of corporate (enterprise) email and voicemail and so may prevent the backup of this data or allow the backup of this data but encrypt it. However, the IT administrator may not be concerned about controlling the backup of Game databases and so may place lesser or controls on these databases (i.e., allow backup but do not apply encryption).

Referring now to FIG. 6, a restore process 600 in accordance with another example embodiment of the present application will now be described. The process 600 provides a method of restoring data from a backup file contained encrypted data created by the backup process 500 to a mobile communication device 201. The process 600 is similar to the process 400 described above except that it decrypts and transfers data items to the computing device on database-by-database basis, and optionally provides for multiple encryption and decryption pair keys (which may be symmetric or asymmetric), for example, providing a separate encryption and decryption key pair for each database for a particular enterprise user or mobile communication device 201.

In the first step 602, the mobile communication device 201 is connected to the computing device (i.e., the user's enterprise computer terminal or home computer terminal) where the backup file, for example an IPD file or backup file compatible with the IPD file format, is stored.

Next, in step 604, the computing device receives a request to restore the backup file comprising one or more databases each comprising one or more encrypted data items to the mobile communication device 201.

Next, in step 607, a database to be restored is selected. Next, in optional step 608, the mobile communication device 201 determines if the selected database contains encrypted data items. If database does not contact encrypted data items, the mobile communication device 201 will not accept the databases and operation proceed to step 616, where it is determined if there are other database to restored (alternatively, the restore operations 600 could end if any database does not contain encrypted data times). If there are no other databases to restore, the operations 600 end. If there are other databases to restore, the operations 600 proceed back to step 607 where the next database is selected. If the database contains encrypted data items, the operation 600 proceed to step 609 where the encrypted data item is extracted from the database and transferred to the mobile communication device 201. Alternatively, in other embodiments the mobile communication device 201 will accept the unencrypted databases, for example, where the backup process 500 does not encrypt all backed up databases.

Next, in step 610, the encrypted data item is decrypted using the decryption key 274. If there is no decryption key 274 stored in the memory of the mobile communication device 201, or if the decryption key 274 does not match, the decryption operation fails and, typically, the restore operation 600 ends.

Next, in step 612, the decrypted data item is stored in memory, for example flash memory 244, of the mobile communication device 201. The mobile communication device 201 may also organize the stored data items, for example, into the databases described above. This organization step may occur at this time, or after all data items have been restored.

Next, if there are more data items to be restored (step 614), the restore operations 600 loop back to step 609 where the next data item is transferred to the mobile communication device 201. If there are no more data items to be restored in the database, the operations 600 proceed to step 616, where it is determined if there are other database to be restored. If there are no other databases to restore, the operations 600 end. If there are other databases to restore, the operations 600 proceed back to step 607 where the next database is selected.

The backup and restore processes described above allow an enterprise to place restrictions on how data which is backed up from an enterprise mobile communication device 201 may be used. Using the backup processes 300, 500 and the restore processes 400, 600, backup data can only be restored to an enterprise mobile communication device 201 that has been activated and authorized by the enterprise server 120. As a result, a user cannot backup data from an enterprise mobile communication device 201 and restore the data to a personal mobile communication device 201 since the personal device will not have the required decryption key. In addition, because the backup data is encrypted, the use of other applications on the external computing device which may otherwise be able to read the backup file and the backup data contained therein is hindered or prevented. Thus, the backup processes 300, 500 and the restore processes 400, 600 assist in reducing or preventing the unauthorized use of data from an enterprise mobile communication device 201 by a "rogue user".

It will be appreciated that while the backup processes 300, 500 and the restore processes 400, 600 have been described and shown as occurring in a particular order, persons skilled in the art will understand that variations are possible. For example, the step of generating the backup file need not be performed prior to the step of adding the encrypted data item to the backup file. Furthermore, the step of storing the backup file in persistent memory of the external computing device may occur after each encrypted data item is added (i.e., incremental updating of the stored file may occur), and that prior to storing the backup file in persistent memory, the backup file may be temporally stored in volatile memory of the external computing device such as RAM.

Although reference has been made to certain wireless network types and standards for the purpose of illustration, such as the IEEE 802.11x standards, it will be appreciated that the present application is intended to cover all further revisions, supplements, additions and replacements to the referenced network types and standards, whether or not explicitly described above.

The present application describes a system and method for providing secure data backup from a mobile communication device to an external computing device, and for restoring data from the external computing device. Data being backed up is encrypted with a local encryption key stored on the mobile communication device before being transferred to the external computing device where the encrypted data is included in a backup file generated by a backup application running on the external computing device. The local encryption key is securely provided to the mobile communication device by an enterprise server which manages its communications. To restore data, a local decryption key is used (which may be same as the encryption key if a symmetric key protocol is implemented). The decryption key is securely provided o the mobile communication device by the enterprise server. During a restore operation, encrypted data is transferred from the external computing device to the mobile communication device where it is decrypted using the local decryption key. If the mobile communication device does not have a decryption key or if the key does not match, the restore operation fails as the data cannot be decrypted. Thus, data restore operations are limited to a user's enterprise mobile communication devices.

In accordance with a first example embodiment of the present application, there is provided a method of backing up data from a mobile communication device to an external computing device, the mobile communication device being connected to the external computing device for exchanging data with each other, the method comprising: receiving a request to backup one or more data items in a plurality of data items stored on the mobile communication device; encrypting a data item using an encryption key stored in memory of the mobile communication device; transferring the encrypted data item to the external computing device; and storing a backup file comprising the encrypted data item in the memory of the external computing device.

In accordance with another example embodiment of the present application, there is provided a method of restoring backup data to a mobile communication device from an external computing device, the mobile communication device being connected to the external computing device for exchanging data with each other, the method comprising: receiving a request to restore data from a backup file to the mobile communication device, the backup file comprising one or more encrypted data items; transferring an encrypted data item to the mobile communication device from the external computing device; and decrypting the data item using a decryption key stored in the memory of the mobile communication device.

In accordance with a further example embodiment of the present application, there is provided a mobile communication device, comprising: a processor for controlling the operation of the mobile communication device; a data interface coupled to the processor configured for communicating with external computing devices and for exchanging data therewith; a memory coupled to the processor and having data and instructions stored thereon, the memory having stored thereon an encryption key and a plurality of data items of user application data and service data, the data and instructions configuring the processor to: in response to receiving a request to transfer data items received from a backup application on an external computing device received via the data interface, encrypt the data items with the encryption key, and transmit the encrypted data items to the external computing device via the data interface.

In accordance with yet a further example embodiment of the present application, there is provided a computing device, comprising: a processor for controlling the operation of the computing device; a user input device coupled to the processor and configured for receiving user inputs; a data interface coupled to the processor and configured for communicating with a mobile communication device and for exchanging data therewith; a memory coupled to the processor and having data and instructions stored thereon, the data and instructions configuring the processor to: receive a request from a user to backup one or more data items in a plurality of data items stored on the mobile communication device; request the one or more data items from the mobile communication device; receive encrypted data items from the mobile communication device via the data interface in response to the request; and store the encrypted data items in a backup file in the memory.

In accordance with yet a further example embodiment of the present application, there is provided a method for implementing secure data backup from a mobile communication device to an external computing device, the method comprising: receiving a policy message on the mobile communication device, the policy message comprising a rule for the mobile communication device to encrypt at least some of the data items in response to a request to transfer data items received during a backup to an external computing device before transmitting the items to the external computing device; and receiving an encryption key for encrypting data items during the backup of data items on the mobile communication device.

In accordance with yet a further example embodiment of the present application, there is provided a method of backing up data from a mobile communication device to an external computing device, the mobile communication device being connected to the external computing device for exchanging data with each other, the data comprising one or more databases each comprising one or more data items, the method comprising: determining which databases on the mobile communication device are available for backup; receiving a request to backup selected databases stored on the mobile communication device; for each selected database, determining if the selected database is to be encrypted; if the selected database is to be encrypted, encrypting the selected database using an encryption key stored in memory of the mobile communication device, and transferring the encrypted database to the external computing device; if the database is not to be encrypted, transferring the unencrypted database to the external computing device; storing a backup file comprising the selected databases in the memory of the external computing device. In some embodiments, the method further comprises, for each selected database, selecting an encryption key for the database, the encryption key being selected from a plurality of encryption keys stored in memory of the mobile communication device. In some embodiments, request includes an identification of the selected databases for backup.

In accordance with yet a further example embodiment of the present application, there is provided a method of restoring backup data to a mobile communication device from an external computing device, the mobile communication device being connected to the external computing device for exchanging data with each other, the method comprising: receiving a request to restore data from a backup file to the mobile communication device, the backup file comprising one or more databases; for each database, determining if the database is encrypted, and if the database is encrypted, transferring the database to the mobile communication device from the external computing device and decrypting the database using a decryption key stored in memory of the mobile communication device and storing the decrypting database in the memory of the mobile communication device. If the database is not encrypted, in some embodiments the unencrypted database is transferred to the mobile communication device and stored in the memory of the mobile communication device. In other embodiments, if the database is not encrypted, the unencrypted database is not transferred to the mobile communication device. In some embodiments, the method further comprises, for each database, selecting a decryption key for the database, the decryption key being selected from a plurality of decryption keys stored in memory of the mobile communication device, wherein each data item in the database is decrypted using the selected decryption key.

In accordance with further embodiments of the present application, there is provided an apparatus such as a computing device or data processing system, a method for adapting this system, articles of manufacture such as a machine or computer readable medium having program instructions recorded thereon for practising the method of the application, as well as a computer data signal having program instructions recorded therein for practising the method of the application.

In accordance with an example embodiment of the present application, there is provided a method of backing up data from a mobile communication device to an external computing device, the mobile communication device being in communication with the external computing device, the method comprising: receiving from an enterprise server an encryption key for encrypting data items during the backup of data items on the mobile communication device, the encryption key being alterable only via the enterprise server; storing the encryption key in a protected memory of the mobile communication device, the protected memory being protected from access by unauthorized applications; the mobile communication device receiving a request from an authorized application to backup one or more data items stored on the mobile communication device to the external computing device, the external computing device being physically separate from the enterprise server; the mobile communication device encrypting a data item using the encryption key stored in the protected memory of the mobile communication device; and transferring the encrypted data item from the mobile communication device to the external computing device for storage by the external computing device.

In accordance with an example embodiment of the present application, there is provided a method of restoring backup data to a mobile communication device from an external computing device, the mobile communication device being in communication with the external computing device, the method comprising: receiving from an enterprise server a decryption key for decrypting encrypted data items during the restoration of encrypted data items on the mobile communication device, the decryption key being alterable only via the enterprise server; storing the decryption key in a protected memory of the mobile communication device, the protected memory being protected from access by unauthorized applications; receiving a request from an authorized application to restore one or more encrypted data items stored in the external computing device to the mobile communication device, the external computing device being physically separate from the enterprise server; transferring an encrypted data item to the mobile communication device from the external computing device; and decrypting the encrypted data item using the decryption key stored in the protected memory of the mobile communication device.

In accordance with an example embodiment of the present application, there is provided a mobile communication device, comprising: a processor; a data interface coupled to the processor, the data interface configured for communicating with an external computing device; a memory coupled to the processor and having data items and instructions stored thereon, the memory including a protected memory having stored thereon an encryption key received from an enterprise server that is physically separate from the external computing device, the protected memory being protected from access by unauthorized applications, the instructions directing the processor to: in response to receiving a request from an authorized application to backup data items, encrypt the data items with the encryption key, and transfer the encrypted data items to the external computing device via the data interface.

In accordance with an example embodiment of the present application, there is provided a communication system, comprising an enterprise server; an external computing device which is physically separate from the enterprise server; at least one mobile communication device configured for communicating with the enterprise server and the external computing device, the mobile communication device comprising: a processor; and a memory coupled to the processor and having data items and computer executable instructions stored thereon, the memory including a protected memory having stored thereon an encryption key received from the enterprise server, the protected memory being protected from access by unauthorized applications. The instructions when executed, directing the processor to: in response to receiving a request from an authorized application to backup one or more data items stored on the mobile communication device to the external computing device, encrypt the one or more data items with the encryption key, and transfer the encrypted data items to the external computing device.

While the present application is primarily described as a method, a person of ordinary skill in the art will understand that the present application is also directed to a device (such as a mobile communication device, external capturing device, and enterprise server described above), for carrying out the described methods and including components for performing each described method step, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus (i.e., a mobile communication device, external capturing device, and enterprise server described above), articles of manufacture, and computer data signals also come within the scope of the present application. In addition, a communication system comprising an enterprise server and a plurality of mobile communication devices connected via a wireless communication network, in which the mobile enterprise server is configured to implement at least some of the processes herein described (i.e., to send out IT policies), and in which one or more of the mobile communication devices are configured to implement at least some of the processes herein described, also comes within the scope of the present application.

The embodiments of the present application described above are intended to be examples only. Those of skill in the art may effect alterations, modifications and variations to the particular embodiments without departing from the intended scope of the present application. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of backing up data from a mobile communication device to an external computing device, the mobile communication device being in communication with the external computing device, the method comprising:
receiving from an enterprise server an encryption key for encrypting data items during the backup of data items on the mobile communication device, the encryption key being alterable only via the enterprise server;
storing the encryption key in a protected memory of the mobile communication device, the protected memory being protected from access by unauthorized applications;
the mobile communication device receiving a request from an authorized application to backup one or more data items stored on the mobile communication device to the external computing device, the external computing device being physically separate from the enterprise server;
the mobile communication device encrypting a data item using the encryption key stored in the protected memory of the mobile communication device; and
transferring the encrypted data item from the mobile communication device to the external computing device for storage by the external computing device.

2. The method of claim 1, wherein the data items comprise user application data and service data stored in the protected memory of the mobile communication device.

3. The method of claim 1, further comprising, storing a backup file comprising the encrypted data item in a memory of the external computing device.

4. The method of claim 3, further comprising, after transferring the encrypted data item, adding the encrypted data item to the backup file.

5. The method of claim 1, wherein the request comprises a request to backup one or more databases stored in the memory of the mobile communication device, each database comprising one or more data items, the method further comprising:
for each database, selecting the encryption key for the database, the encryption key being selected from a plurality of encryption keys stored in the protected memory of the mobile communication device, wherein each data item in the database is encrypted using the selected encryption key.

6. The method of claim 1, wherein the request comprises a request to backup selected databases stored on the mobile communication device and wherein the encrypting and transferring comprises:
for each selected database,
determining if the selected database is to be encrypted;
if the selected database is to be encrypted, encrypting the selected database using an encryption key stored in the protected memory of the mobile communication device and transferring the encrypted database to the external computing device; and
if the database is not to be encrypted, transferring the unencrypted database to the external computing device.

7. The method of claim 6, further comprising, for each selected database, selecting the encryption key for the database, the encryption key being selected from a plurality of encryption keys stored in the protected memory of the mobile communication device.

8. The method of claim 1, further comprising:
receiving a policy message on the mobile communication device, the policy message comprising a rule for the mobile communication device to encrypt at least some of the data items in response to the request to backup one or more data items.

9. The method of claim 8, wherein the policy message further comprises the encryption key and wherein the policy message is securely received from the enterprise server managing the communications of the mobile communication device.

10. The method of claim 9, wherein the policy message further comprises a rule for the mobile communication device to decrypt encrypted data items received from the external computing device during a restore, and a decryption key for decrypting the encrypted data items during the restore of data items on the mobile communication device.

11. A method of restoring backup data to a mobile communication device from an external computing device, the mobile communication device being in communication with the external computing device, the method comprising:
receiving from an enterprise server a decryption key for decrypting encrypted data items during the restoration of encrypted data items on the mobile communication device, the decryption key being alterable only via the enterprise server;

storing the decryption key in a protected memory of the mobile communication device, the protected memory being protected from access by unauthorized applications;

receiving a request from an authorized application to restore one or more encrypted data items stored in the external computing device to the mobile communication device, the external computing device being physically separate from the enterprise server;

transferring an encrypted data item to the mobile communication device from the external computing device; and decrypting the encrypted data item using the decryption key stored in the protected memory of the mobile communication device.

12. The method of claim 11, further comprising:
storing the decrypted data item in a memory of the mobile communication device.

13. The method of claim 11, wherein the request comprises a request to restore data items from a backup file to the mobile communication device, the backup file comprising one or more encrypted data items stored in the external computing device.

14. The method of claim 11, wherein the request comprises a request to restore one or more databases stored in the external computing device, each database comprising one or more encrypted data items, the method further comprising:
for each database, selecting the decryption key for the database, the decryption key being selected from a plurality of decryption keys stored in the protected memory of the mobile communication device, wherein each encrypted data item in the database is decrypted using the selected decryption key.

15. The method of claim 11, wherein the request comprises a request to restore one or more databases stored in the external computing device, each database comprising one or more data items, and wherein the transferring and decrypting comprises:
for each database,
determining if the database is encrypted;
if the database is encrypted, transferring the database to the mobile communication device from the external computing device and decrypting the database using a decryption key stored in the protected memory of the mobile communication device and storing the decrypting database in the protected memory of the mobile communication device.

16. The method of claim 15, wherein if the database is not encrypted, the unencrypted database is transferred to the mobile communication device and stored in a memory of the mobile communication device.

17. The method of claim 15, wherein if the database is not encrypted, the unencrypted database is not transferred to the mobile communication device.

18. The method of claim 15, further comprising, for each database, selecting a decryption key for the database, the decryption key being selected from a plurality of decryption keys stored in the protected memory of the mobile communication device, wherein each encrypted data item in the database is decrypted using the selected decryption key.

19. The method of claim 11, further comprising:
receiving a policy message on the mobile communication device, the policy message comprising a rule for the mobile communication device to decrypt encrypted data items received from an external computing device during the restore, the policy message further comprising the decryption key for decrypting the encrypted data items during the restore of data items on the mobile communication device; and
storing the rule and the decryption key in the protected memory of the mobile communication device.

20. A mobile communication device, comprising:
a processor;
a data interface coupled to the processor, the data interface configured for communicating with an external computing device;
a memory coupled to the processor and having data items and instructions stored thereon, the memory including a protected memory having stored thereon an encryption key received from an enterprise server that is physically separate from the external computing device, the protected memory being protected from access by unauthorized applications, the instructions directing the processor to:
in response to receiving a request from an authorized application to backup data items, encrypt the data items with the encryption key, and transfer the encrypted data items to the external computing device via the data interface.

21. The mobile communication device of claim 20, wherein the protected memory further includes a decryption key received from the enterprise server, the data and instructions further configuring the processor to:
in response to receiving encrypted data items via the data interface from the external computing device, decrypt the encrypted data items with the decryption key, and store the decrypted data items in the memory.

22. A communication system, comprising
an enterprise server;
an external computing device which is physically separate from the enterprise server;
at least one mobile communication device configured for communicating with the enterprise server and the external computing device, the mobile communication device comprising:
a processor; and
a memory coupled to the processor and having data items and computer executable instructions stored thereon, the memory including a protected memory having stored thereon an encryption key received from the enterprise server, the protected memory being protected from access by unauthorized applications, the instructions when executed, directing the processor to:
in response to receiving a request from an authorized application to backup one or more data items stored on the mobile communication device to the external computing device, encrypt the one or more data items with the encryption key, and transfer the encrypted data items to the external computing device.

23. The communication system of claim 22, wherein the at least one mobile communication device comprises two mobile communication devices, the protected memory of each mobile communication device storing a unique encryption key.

24. The communication system of claim 22, wherein the at least one mobile communication device comprises two mobile communication devices, the protected memory of each mobile communication device storing the same encryption key, the encryption key being associated with an enterprise user.

25. The communication system of claim 22, wherein the protected memory further includes a decryption key received from the enterprise server, the instructions when executed, directing the processor to:
  in response to receiving encrypted data items from the external computing device, decrypt the encrypted data items with the decryption key, and store the decrypted data items in the memory.

* * * * *